May 14, 1929.  H. E. ELLIS  1,713,037
CUTTER HEAD FOR PUMPS
Filed Nov. 8, 1927  2 Sheets-Sheet 1
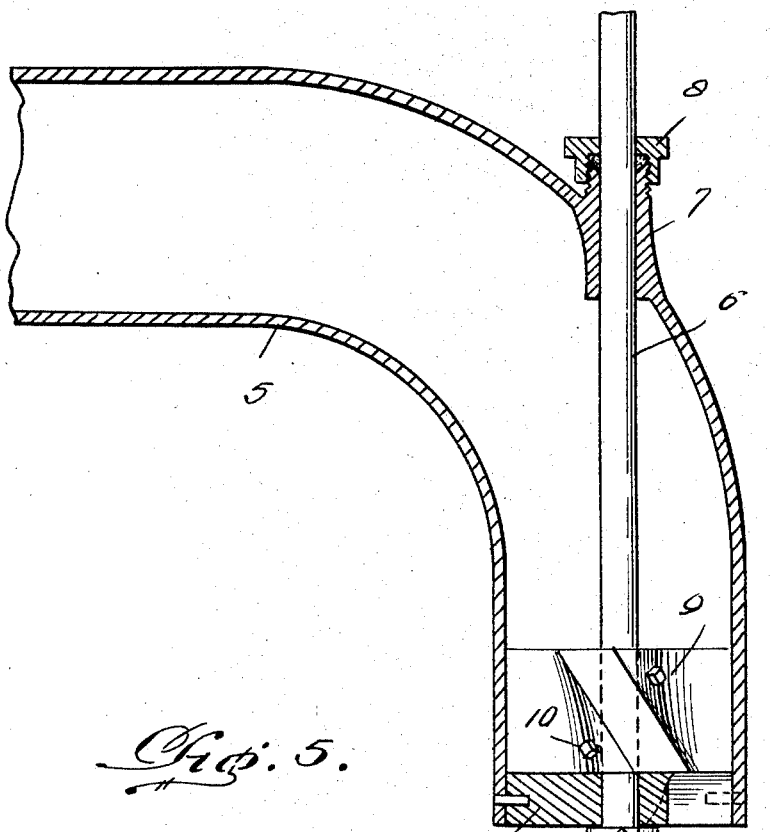
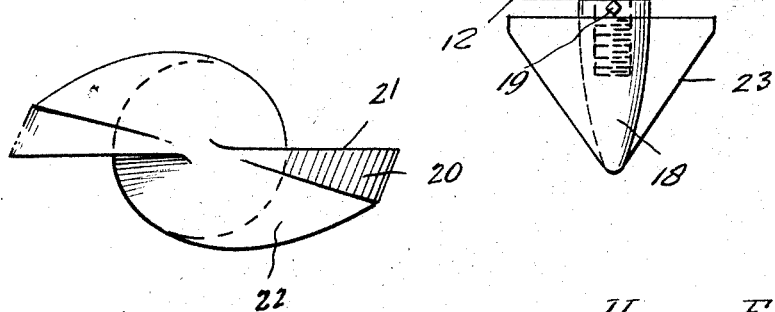
Inventor
Harry E. Ellis,
By Clarence A. O'Brien
Attorney May 14, 1929.　　　　H. E. ELLIS　　　　1,713,037
CUTTER HEAD FOR PUMPS
Filed Nov. 8, 1927　　　　2 Sheets-Sheet 2
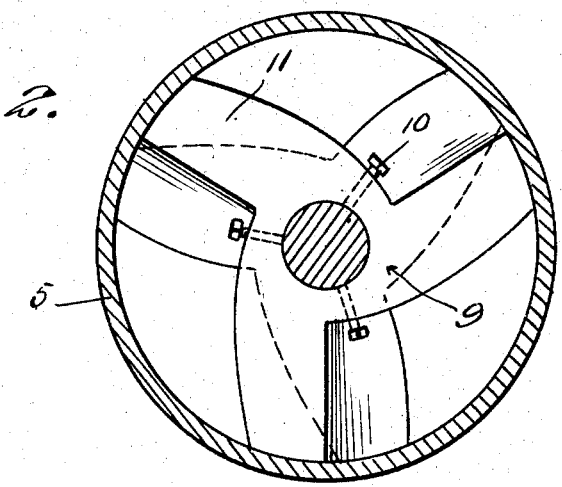
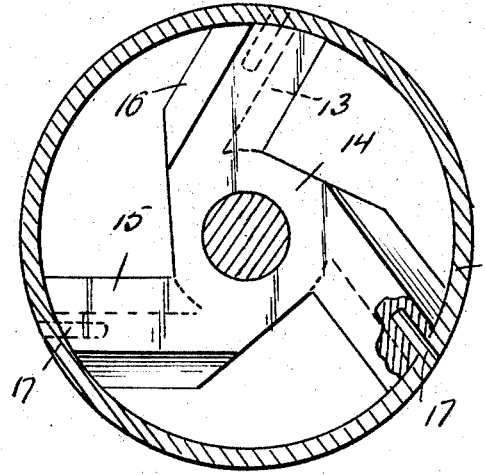
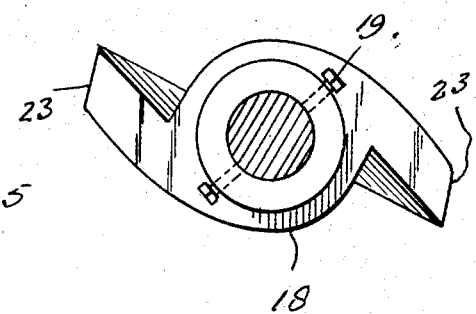
Inventor
Harry E. Ellis,
By Clarence A O'Brien
Attorney Patented May 14, 1929.

1,713,037

UNITED STATES PATENT OFFICE.

HARRY E. ELLIS, OF ELKHORN, WISCONSIN.

CUTTER HEAD FOR PUMPS.

Application filed November 8, 1927. Serial No. 231,892.

The present invention relates to suction pipes for pumps and has for an object to provide a cutter head at the intake end of the suction pipe adapted to cut weeds, roots, soil or other material before the entrance of the same into the intake of the suction pipe whereby to cut such material into a convenient size for easy handling by the main pump. The device is admirably adapted for use in connection with the drainage of lakes, swamps and other shallow pools having a growth of vegetation therein which ordinarily upon being drawn into the suction pipe by the pump would have a tendency to interfere with the efficient operation of the pump blade, and accordingly the purpose of my invention is to provide an attachment at the intake end of the suction pipe to cut such vegetation into small sizes before the entrance thereof into the suction pipe and thereby insure the efficient operation of the pump.

A further object of the invention is to provide an apparatus of this character of simple and practical construction, which is efficient and reliable in performance, inexpensive to manufacture, maintain and install in operative position within the suction pipe and otherwise well adapted for the purposes for which the same is intended.

Other objects and advantages reside in the special construction and combination of the various elements comprising the invention, reference being had to the accompanying drawings forming a part hereof, wherein:

Figure 1 is a vertical sectional view through the end of the suction pipe showing my device in operative position, Figure 2 is a transverse sectional view through the rotating cutter, Figure 3 is a similar view through the stationary cutter, Figure 4 is a sectional view through the end of the cutter shaft showing the inner end of the nose, and Figure 5 is an end view of the nose.

Referring now to the drawing in detail, I have shown my invention adapted for use upon the pump suction pipe indicated at 5 and preferably constructed in the form of an elbow with its extremity arranged to extend vertically so as to permit the same to extend downwardly through the body of fluid desired to be pumped through the pipe. The upper end of the pipe is connected with the usual power driven pump mechanism for creating a suction in the lower end of the pipe and thereby drawing the fluid and other materials therethrough.

At the outer vertically disposed end of the pipe is arranged a centrally disposed cutter shaft 6 and through an opening formed in the wall of the pipe constituting a bearing 7 for the shaft, the outer end of the bearing being provided with a packing nut 8 to prevent escape of fluid through the opening formed in the wall of the pipe.

Mounted on the shaft adjacent the end of the pipe is arranged a movable cutter 9 secured to the shaft for rotation therewith by set screws 10 and provided with a plurality of spirally formed cutting blades 11 extending radially from the shaft. The outer ends of the blades are provided with sufficient clearance to enable the same to freely rotate within the end of the suction pipe 5.

Immediately outwardly of the rotatable cutter 9 is arranged a stationary cutter 12 comprising a plurality of cutting blades 13 extending substantially radially from a hub 14, each side of the blade being beveled as indicated at 15 where by to form the inner face of the cutter into a substantial knife edge as indicated at 16. The hub is provided with a centrally disposed bore enabling the same to permit the free insertion of the shaft 6. The end of each of the blades is formed with an inwardly extending opening through which the dowel pin 17 extending through the suction pipe 5 may be inserted whereby to secure the cutter against rotation.

The lower end of the shaft 6 extends outwardly from the end of the suction pipe and is threaded as indicated in Figure 1, whereby to enable the body portion 18 of a nose member to be threadedly retained thereon. A set screw 19 is inserted through the body engaging the shaft and serves to secure the nose in position thereon against accidental displacement. At diametrically opposite sides of the body 18 extends a pair of cutting blades 20, the forward face of each of the blades indicated at 21 being of a flattened or slightly concaved formation whereas the opposite or rear face 22 of the blade is rounded to form a gradual merger with the body 18 of the nose. The side edges 23 of each of the blades tapers outwardly from the end of the nose in a manner as clearly illustrated in Figure 1 of the drawings.

It will be observed that the rear edge of the blade 20 on the nose terminates short of the body 18 thereof whereby to space the rear edge of the blade from the stationary cutting member 12. Such spacing arrangement enables relatively coarse material to pass beyond the blades of the nose for entering the end of the suction pipe between the stationary cutting member 12 and the rotating cutter member 9 and by the cutting action of such members, the size of the material is further reduced before permitting the passage of the same into the body of the suction pipe. In this manner a rotating cutting member is disposed at each side of the stationary cutting member 12.

By spirally forming the cutting blades 11 of the rotating cutter member 9 the pumping action is thus increased.

It is to be understood that the upper end of the cutter shaft 6 may be connected in any suitable manner to power mechanism for the operation thereof in a suitable manner.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. In combination, a pump intake pipe, a shaft rotatably mounted within the pipe, a stationary cutting member arranged at the intake end of the pipe and a pair of rotatable cutting members mounted on said shaft at the opposite sides of said stationary member and disposed in cutting relation with respect thereto.

2. In combination, a pump intake pipe, a shaft rotatably mounted within the pipe and extending longitudinally with respect thereto, a stationary cutting member composed of a plurality of cutting blades having their ends secured to the wall of the pipe and rotatable cutting members carried by the shaft disposed at the opposite sides of said stationary cutting member, with the blades of the outermost rotating cutting member spaced substantially from said stationary cutting member and the blades of the innermost rotating cutting member disposed in substantially closely cutting relation with respect to the stationary cutting member.

3. In combination with a pump intake pipe of a cutting attachment comprising a shaft concentrically mounted at the intake end of the pipe and extending through the wall of the pipe in advance of the opposite end thereof and supported for rotation thereby, a stationary cutting member mounted at the end of the pipe and comprising a hub freely mounted on the shaft, a plurality of blades extending substantially radially from the hub and formed with beveled cutting edges, means extending through the wall of the pipe engaging the blade for retaining the same against movement therein, a cutting member mounted for rotation upon the shaft disposed inwardly with respect to said stationary cutting member and provided with a plurality of spirally formed cutting blades with their edges in close engagement with the beveled edges of said stationary cutting member, and a cutting member mounted for rotation upon the outer end of the shaft comprising a body having a pair of diametrically extending cutting blades, said blades having their inner ends arranged in spaced relation from said stationary cutting member with the side edges of said blades tapering rearwardly and the forward face of the blades of a substantially flat formation with the rear face thereof curved to form a gradual merger with the body portion thereof.

4. In combination, a pump intake pipe, a shaft rotatably mounted within the pipe, a stationary cutting member arranged at the intake end of the pipe and provided with cutting edges at its inner and outer faces, and a pair of rotatable cutting members mounted on said shaft at the opposite sides of the stationary member and disposed in cutting relation with respect thereto.

In testimony whereof I affix my signature.

HARRY E. ELLIS.